Patented Jan. 21, 1936

2,028,502

UNITED STATES PATENT OFFICE 2,028,502

SEASONING PLASTIC

Paul W. Crane, Montclair, and Reuben T. Fields, Arlington, N. J., assignors to Du Pont Viscoloid Company, Wilmington, Del., a corporation of Delaware No Drawing. Application April 27, 1935, Serial No. 18,682

5 Claims. (Cl. 18—51)

This invention relates to seasoning plastics and, more particularly, to a method of seasoning extruded cellulose ester plastic sheeting by a continuous operation.

Cellulose ester plastic sheeting has been produced heretofore by extrusion under pressure of the cellulose ester composition in the form of a soft dough through a slit-like orifice. Crane and Fields U. S. Patent 1,956,564, patented May 1, 1934, gives a full disclosure of this method of producing sheeting. As disclosed in that patent, the plastic mass is extruded into a cooling and setting bath of brine. The contact of the sheeting with the cold brine hardens it sufficiently by mere chilling so that the sheeting has sufficient tenacity to be pulled forward through the bath as it is formed. The bath also hardens the sheeting to some degree through extracting from it some of the volatile solvent originally present in the dough which was extruded.

This hardening of extruded sheeting by seasoning in brine at low temperatures progresses slowly and it is not feasible to remove the sheeting from this bath promptly to air seasoning equipment operated at ordinary air seasoning temperatures, because as soon as the sheeting becomes warmed, its softness causes it to sag and stretch and otherwise to become distorted. On the other hand, it is not practical to continue the seasoning at the slow rate obtaining at the low temperature of the initial cooling or setting bath.

An object of this invention is to provide a simple and economical method of seasoning extruded cellulose ester plastic sheeting. A further object is to provide a method of doing this at a much more rapid rate than heretofore possible without distortion of the sheeting or causing any permanent blushing of the sheets. Other objects of the invention will be apparent from the description given hereinafter.

The above objects are accomplished according to the present invention by running the extruded cellulose ester plastic sheeting through sodium chloride brine, the temperature of said brine at the point where the sheeting is first introduced therein being relatively low and of the same order as used in the cooling and setting baths heretofore employed, and the temperature of the brine progressively increasing along the path of travel of the sheeting at a rate correlated with the rate of decrease of solvent content in the sheeting as it travels through the brine so that the temperature of the sheeting does not rise sufficiently to cause distortion of the sheeting, and thereafter seasoning the sheeting further in air.

It has been found that an unexpectedly rapid removal of solvent is effected by leaving the sheeting in contact with the brine bath but raising the temperature of the latter either continuously or in steps at such rate as will keep pace with the decreasing solvent content of the sheeting so that, on the one hand, a maximum feasible temperature is applied with corresponding maximum rate of extraction of solvent, but, on the other hand, at no time is the temperature of the sheeting permitted to rise to such an extent that it becomes too soft and thus subject to distortion.

It has been further found that, in carrying out seasoning by employing a progressive rise of temperature in the brine bath, the presence of the brine solution is of surprising and unexpected advantage in that it not only retards blushing of the sheeting in the cold at the early stages of the sheeting, while the sheeting still contains considerable solvent, but also has the effect of promoting a complete clearing up of the blushing during the subsequent rise in temperature. The brine solution has a specific gravity approximately that of the unseasoned sheeting and hence the brine bath exerts a distinct buoying effect upon the soft sheeting so that it has little tendency to sag in the course of travel between supports in the bath, thus enabling a more rapid progressive increase in the temperature of the brine solution than would be safe if a bath having the specific gravity of water alone were employed.

In the following examples are illustrated specific methods of seasoning plastic sheeting according to the present invention:

*Example 1.*—A plastic dough of the following composition:

| | Parts by weight |
|---|---|
| Cellulose nitrate | 43.7 |
| Camphor | 14.8 |
| Ethyl alcohol | 31.1 |
| Acetone | 10.4 | was extruded at a rate of about 3 feet per minute into a bath of 22% sodium chloride brine maintained at 9° C. The vessel containing this liquid was of such length that the sheeting remained in contact with this first bath for approximately 3 minutes. From this bath the sheeting was carried directly, with a minimum of contact with warm air, into the second of a series of baths maintained at progressively higher temperatures and so on through a total of 23 baths, excluding the first bath, said baths being approximately 50 feet each in length. The temperature of the brine in the last bath was maintained at 70° C. The time of immersion during travel through each of the baths and the increments of temperature between successive baths were such that the temperature applied to the sheeting at intervals of one hour were approximately as follows:

| | Centigrade |
|---|---|
| At start | 9° |
| After one hour | 38° |
| After two hours | 50° |
| After three hours | 60° |
| After four hours | 65° |
| After five hours | 65° |
| After six hours | 70° |

The sheeting was then passed into a seasoning compartment in which it was circulated in air at 65° C. for 2 hours and emerged therefrom in completely seasoned condition for use in safety glass. The thickness of the sheeting was 0.026".

*Example 2.*—A plastic dough of the following composition:

| | Parts by weight |
|---|---|
| Cellulose acetate | 36.4 |
| Dimethyl phthalate | 18.6 |
| Diethyl phthalate | 8.7 |
| Alcohol | 27.2 |
| Acetone | 9.1 | was extruded into a bath of 21% sodium chloride brine to form a continuous sheet at a linear rate of 5.5 feet per minute. The temperature of the first bath was maintained at 10° C. and the travel through the first bath required 2.5 minutes. The sheeting was then passed continuously into successive baths of 21% sodium chloride brine, 23 in number, so as to encounter gradually increasing temperatures represented approximately by the following:

| | Centigrade |
|---|---|
| After 1 hour | 32° |
| After 2 hours | 38° |
| After 2.5 hours | 40° |
| After 3.5 hours | 47° |

The sheeting was then passed through a hot air drying compartment in which it was subjected to a temperature of 50° C. for 1.5 hours, and emerged therefrom completely seasoned and ready for use.

*Example 3.*—A plastic dough having the following composition:

| | Parts by weight |
|---|---|
| Cellulose acetate | 36.5 |
| Dimethyl phthalate | 31.4 |
| Ethyl alcohol | 24.8 |
| Methyl ethyl ketone | 7.3 | was extruded into a bath of 22% sodium chloride brine at a temperature of 14° C. The rate of extrusion was 10 feet per minute and the sheeting required 1.5 minutes to pass through the first hardening and seasoning bath. Thereafter it was passed through baths of 22% sodium chloride brine so as to give the following approximate seasoning treatment:

| | Centigrade |
|---|---|
| For 10 minutes at | 15° |
| For 25 minutes at | 25° |
| For 35 minutes at | 30° |
| For 35 minutes at | 33° |
| For 35 minutes at | 36° |
| For 35 minutes at | 43° |

The sheeting was then passed through a festooning chamber in contact with air at 56° C. for 90 minutes, and emerged therefrom completely seasoned and ready for use.

It is to be understood that the above examples are merely illustrative and that the method of the present invention may be varied considerably without departing from the spirit of the invention. Obviously, the progressive rise in temperature of the seasoning liquid may be continuous or in steps. To effect seasoning at a maximum rate, the temperature at all times will be maintained as high as is consistent with avoiding softening of the sheeting to such a degree that it might be damaged by distortion. Theoretically, a continuous uninterrupted rise of temperature at a rate consistent with the avoidance of softening of the sheeting will give the most rapid seasoning but, in commercial equipment, continuous increase of temperature will, ordinarily, be less feasible than an increase in steps. The provision of a considerable number of successive compartments, in each of which the material stays for a relatively short time, will approximate more closely the ideal of a continuous progressive rise in temperature than will the use of a relatively small number of successive baths in each of which the material would remain for a longer time, since, in the latter case, the temperature must be limited for a longer time to that which will not cause excessive softening of the sheeting entering it.

It is desirable to continue the application of the liquid seasoning process until the greater part of solvent has been withdrawn from the sheeting, leaving the sheeting at that point containing only about 3–5% of volatiles, comprising solvent and water. This is done because of the comparatively rapid removal of solvent by the brine bath. The sheeting is then air dried for the removal of the greater part of the remaining volatile content.

The maximum temperature to be applied in the liquid bath at any stage of the seasoning is governed by the nature of the composition of the sheeting and, particularly, by what softening temperature it has at the stage of seasoning in question. A composition containing a large percentage of plasticizer softens more readily at a given solvent content than one containing less plasticizer. For example, the final temperature to be applied to a cellulose acetate sheet containing 45% of dimethyl phthalate as a plasticizer, is only about 45° C., whereas sheeting of standard nitrocellulose composition containing 75 parts cellulose nitrate and 25 parts camphor may be heated in the final seasoning bath to as high a temperature as 70° C. without being subject to distortion under ordinary conditions of handling through a continuous equipment. It is preferred to use a temperature of at least 45° C. in the final seasoning bath unless this is prohibited by a particularly high plasticizer content in the finished sheeting being seasoned.

The temperature of the initial seasoning bath will invariably be quite low because the soft extruded sheeting depends on the chilling effect of the initial bath to harden it to the point where it can be handled through continuous apparatus. In general a temperature of below about 15° C. will be used in the initial bath and, if desired, a substantially lower temperature can be employed. The seasoning baths according to the present invention employ sodium chloride brine, the concentration of sodium chloride preferably being around 20%, although it may be varied widely without departing from the spirit of this invention. Sodium chloride brine has no harmful effect upon the seasoned sheeting and the fact that the solubility of sodium chloride is little affected by temperature, minimizes trouble with crystallization during shut-downs, and the like, and protects against the deposition of crystals in spite of any non-uniformity of temperature in different parts of the bath, despite the fact that a relatively high concentration of salt is being used.

As those skilled in the art will understand, the solvent extracted from the sheeting by the brine baths is largely recoverable therefrom by ordinary methods. It is usually preferably to carry out the removal of used brine and addition of fresh or recovered brine to the seasoning equipment at such a rate as to maintain the solvent content of the brine in use at between 1% and 3%, although this solvent content does not need to be closely controlled and may be allowed to run appreciably below or above this range without unbalancing the process. Too high a solvent content is to be avoided, particularly at the higher temperatures, since it not only leaches out substantial amounts of plasticizer from the sheeting but also may cause blushing of the sheeting.

The present invention provides a satisfactory and rapid method of seasoning continuous sheeting of cellulose ester plastic and, particularly, the soft sheeting of cellulose acetate or cellulose nitrate formed by extrusion in accordance with the above referred to Crane and Fields patent. Such sheeting which could not be reasoned satisfactorily and economically heretofore, is by the present method, seasoned thoroughly in a short time and without distortion or stretching and without damage to the uniformity of its caliper. Furthermore, the present invention provides a method of seasoning sheeting free of blushing. This method also permits seasoning of sheeting with a freedom from dirt and other foreign matter that cannot be obtained, as a practical matter, when using prior art all air seasoning methods with plastic sheeting. The present invention is also applicable to cellulose ether plastics.

As many apparently widely different embodiments of this invention may be made without departing from the spirit and scope thereof, it is to be understood that the invention is not limited to the specific embodiments thereof except as defined in the appended claims.

We claim:

1. Method of seasoning extruded cellulose ester plastic sheeting comprising running the sheeting through sodium chloride brine, the temperature of said brine at the point where the sheeting is introduced therein being relatively low and the temperature of the brine progressively increasing along the path of travel of the sheeting at a rate correlated with the rate of decrease of solvent content in the sheeting as it travels through the brine so that the temperature of the sheeting does not rise sufficiently to cause distortion of the sheeting, and thereafter seasoning the sheeting further in air.

2. Method of seasoning extruded cellulose ester plastic sheeting comprising running the sheeting through a series of sodium chloride brine baths, the temperature of the first of said baths being relatively low and the temperatures of the succeeding baths progressively increasing at a rate correlated with the rate of decrease of solvent content in the sheeting as it travels through the series of baths so that the temperature of the sheeting does not rise sufficiently to cause distortion of the sheeting, and thereafter seasoning the sheeting further in air.

3. Method of seasoning extruded cellulose nitrate plastic sheeting comprising running the sheeting through a series of sodium chloride brine baths, the temperature of the first of said baths being not in excess of about 15° C. and the temperatures of the succeeding baths progressively increasing to a temperature of at least about 45° C. in the last bath at a rate correlated with the rate of decrease of solvent content in the sheeting as it travels through the series of baths so that the temperature of the sheeting does not rise sufficiently to cause distortion of the sheeting, and thereafter seasoning the sheeting further in air.

4. Method of seasoning extruded cellulose acetate plastic sheeting comprising running the sheeting through a series of sodium chloride brine baths, the temperature of the first of said baths being not in excess of about 15° C. and the temperatures of the succeeding baths progresively increasing to a temperature of at least about 45° C. in the last bath at a rate correlated with the rate of decrease of solvent content in the sheeting as it travels through the series of baths so that the temperature of the sheeting does not rise sufficiently to cause distortion of the sheeting, and thereafter seasoning the sheeting further in air.

5. Method of seasoning cellulose ester plastic sheeting adapted to give a seasoned sheet of the order of 0.026" thickness containing approximately 25–46% plasticizer by weight, comprising running the sheet through a series of sodium chloride brine baths, the temperature of the first of said baths being not in excess of about 15° C. and the temperatures of the succeeding baths progressively increasing to a temperature of at least about 45° C. in the last bath at a rate correlated with the rate of decrease of solvent content in the sheeting as it travels through the series of baths so that the temperature of the sheeting does not rise sufficiently to cause distortion of the sheeting, and thereafter seasoning the sheeting further in air at a temperature of at least about 50° C.

PAUL W. CRANE.
REUBEN T. FIELDS.